United States Patent [19]

Alander

[11] 4,383,781
[45] May 17, 1983

[54] PROCEDURE FOR MAKING ANGLE JOINTS AND ANGLE JOINTING UNIT FOR PICTURE FRAMES

[76] Inventor: Kaarina Alander, Granangsringen 16 A, S-13544 Tyreso, Sweden

[21] Appl. No.: 261,235

[22] Filed: Jan. 4, 1980

[51] Int. Cl.³ .......................... B25G 3/36; E04G 7/00
[52] U.S. Cl. ..................................... 403/402; 403/295
[58] Field of Search ............... 403/401, 402, 403, 406, 403/188, 231, 294, 295, 339, 364; 40/152, 155, 209

[56] References Cited

U.S. PATENT DOCUMENTS

| | | | |
|---|---|---|---|
| 2,081,722 | 5/1937 | Weinzierl | 40/152 UX |
| 2,805,506 | 9/1957 | Thompson | 40/152 |
| 3,150,457 | 9/1964 | Thieme | 40/152 |
| 3,178,841 | 4/1965 | Howell | 40/152 X |
| 3,200,913 | 8/1965 | Nelson | 403/401 X |
| 3,507,066 | 4/1970 | Widigs | 40/152 |
| 4,064,644 | 12/1977 | Warner et al. | 40/152 |
| 4,161,977 | 7/1979 | Baslow | 403/401 X |

FOREIGN PATENT DOCUMENTS

| | | | |
|---|---|---|---|
| 454116 | 1/1949 | Canada | 403/401 |
| 454117 | 1/1949 | Canada | 403/401 |

*Primary Examiner*—Wayne L. Shedd
*Attorney, Agent, or Firm*—McGlew and Tuttle

[57] ABSTRACT

A frame joint construction comprising at least one pair of moldings which each have at least one of a longitudinally extending groove and a longitudinally extending tongue, and an angle unit having a stiffening plate with at least one of a tongue and groove engaged into the longitudinally extending groove or longitudinally extending tongue of the molding respectively to connect the pair of moldings together. The moldings include a flange extending inwardly of the frame which cooperates with portions of the stiffening plate which also extends inwardly of the frame which cooperates with portions of the stiffening plate which also extend inwardly of the frame to support a picture or the like therebetween.

6 Claims, 10 Drawing Figures

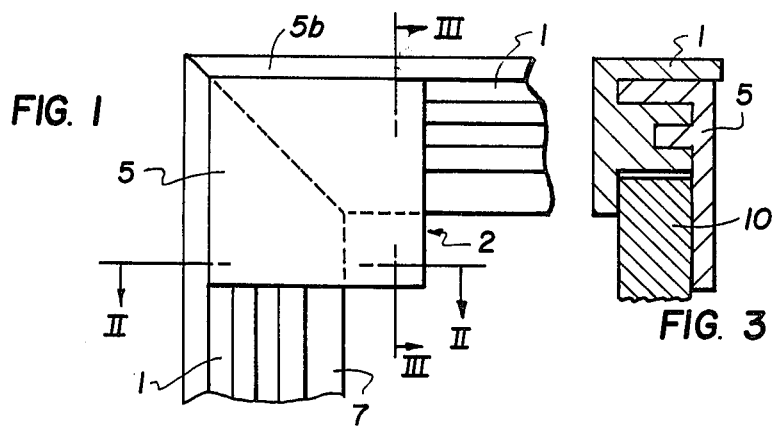
FIG. 1
FIG. 3
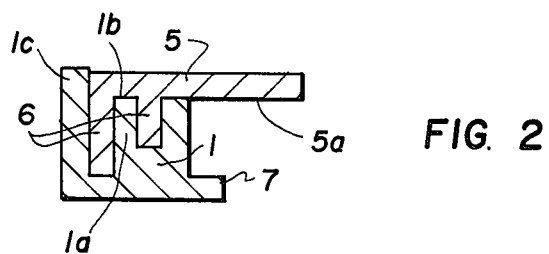
FIG. 2
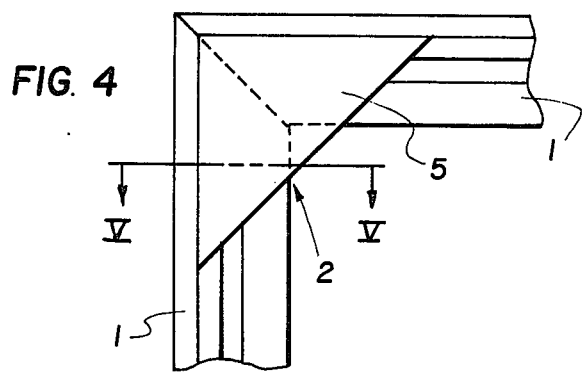
FIG. 4
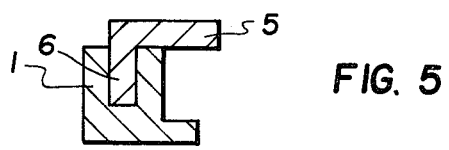
FIG. 5

PROCEDURE FOR MAKING ANGLE JOINTS AND ANGLE JOINTING UNIT FOR PICTURE FRAMES

FIELD AND BACKGROUND OF THE INVENTION

This invention deals with jointing the corners of picture frames made of mouldings or similar profiled strips or edgings (hereinafter referred to as mouldings) with the usual 45° mitre at their ends, which are jointed to each other at right angles with the aid of a special angle jointing unit. The invention also relates to the angle jointing unit itself.

The invention is intended for use in particular when framing paintings, graphic works, photographs, posters and other printed matter.

Several different methods for manufacturing frames, which are made of mouldings with the aid of various angle jointing units intended to lock the strip ends at an angle of 90°, are known. As a rule, the mouldings are die-cast of plastic or metal or are manufactured of metal in some other way. Frame models of this type also generally permit the object which is to be framed, e.g. a painting or an etching with a covering sheet of glass, to be fixed in position in a rapid and simple means without requiring to use e.g. of a hammer and nails. A screwdriver is, however, usually necessary. Despite their generally acknowledged advantages, most known framing methods are, however, so complicated that they cannot compete, e.g. in price, with conventional, simple frame models manufactured manually in trade shops, even if the original idea behind these solutions was to make it possible for the consumer to carry out the framing work himself. A certain disproportion occurs particularly when framing various prints, photographs and amateur art, since the frames may cost many times the value of the object which is to be framed.

SUMMARY OF THE INVENTION

The main purpose of the invention is to achieve a simple frame construction which almost anyone can manufacture in a simple and rapid manner and which is also extremely cheap to manufacture. At the same time, the aim has also been to permit the picture or corresponding object to be fixed in a simple and rapid manner to the frame and, when necessary, to dismantle the frame or replace the picture or corresponding object in the frame with another picture or object.

The procedure according to the invention is mainly characterized by the fact that the frames are built up of a moulding which has, at the rear of the picture, at least one groove or tongue, extending in the longitudinal direction and that the angle unit has at least one corresponding tongue or groove respectively for that of the frame and is jointed by pressing in the angle units from the rear of the frame at each corner of the frame, whereupon the angle units lock the adjacent end of the moulding at the correct angle with the aid of the tongue-and-groove joints.

The angle unit according to the invention is mainly characterized by the fact that it consists of a stiffening plate or the like with at least two straight edges at right angles to each other and at least one tongue (groove) along these edges in all essentials at right angles to the plane which is determined by the stiffening plate.

For an understanding of the principles of the invention, reference is made to the following description of typical embodiments thereof as illustrated in the accompanying drawings.

IN THE DRAWINGS

FIG. 1 is a bottom plan view of an angle joint according to the invention seen from the rear of the frame;

FIGS. 2 and 3 are sectional views taken along the lines II—II and III—III respectively in FIG. 1;

FIGS. 4 and 6 are views similar to FIG. 1 of two other angle joints seen in the same manner;

FIG. 5 shows a section along the line V—V in FIG. 4

DESCRIPTION OF THE PREFERRED EMBODIMENTS

Figure 6:
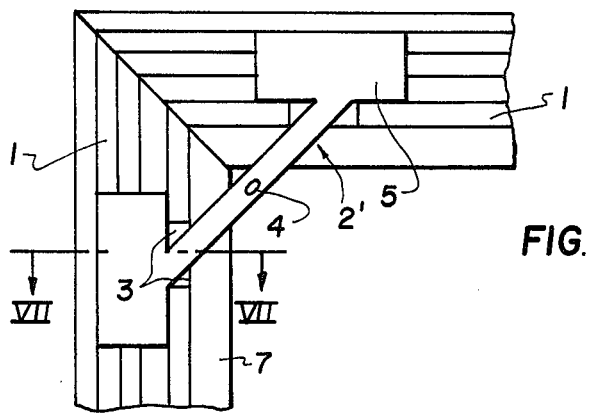

In the design according to FIGS. 1 to 3, moulding 1 which is used as one of four sides of a frame includes two longitudinal grooves into which the tongues 6 on an angle jointing unit 2 are inserted. Angle jointing unit 2 has a square stiffening plate 5. The tongues 6 extends from the outer surface 5a of the stiffening plate. Stiffening plate 5 at the same time constitutes the carcass on the angle unit and joins the tongues 6 of the angle unit firmly to each other at an angle of 90°.

In FIGS. 2 and 3, the molding 1 is shown to have an outer tongue 1c and at least one inner tongue 1a and defining at least one groove therebetween. A stiffening plate 5 with its surface 5a bears down against the top surfaces 1b of the tongues or tongue 1a as the tongue 6 of the angle unit enter the groove defined in the molding 1. A picture 10 is supported by a portion of the stiffening plate 5 which extends beyond the flange 7, and on the flange 7 itself.

In FIGS. 4 and 5, moulding 1 has only one groove and stiffening plate 5 on angle unit 2 has the form of an equilateral right-angle triangle. In a manner corresponding to this moulding, the edge of stiffening plate 5 has only one tongue 6.

Figure 7:
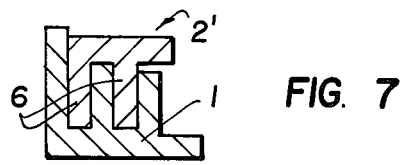
FIG. 7 shows a section along the line VII—VII in FIG. 6.

In the design according to FIGS. 6 and 7, stiffening plate 2' is reminiscent of the letter A with the tip broken off and has two tongues 6 at the outer edges for corresponding grooves in the moulding 1. This design is characterized by the fact that the moulding walls have a recess 3 into which part or cross member 2' fits precisely. This gives an extremely sturdy and reliable angle joint. Part 2' has holes 4 which can be used when hanging the picture with the aid of cord or the like.

Figure 8:
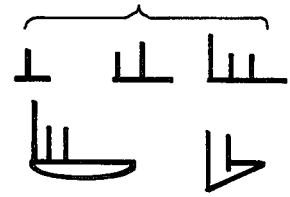
FIG. 8 shows a number of mouldings to which the invention can be applied.

FIG. 8 shows a number of moulding types which can be used when applying the invention. Naturally, many other mouldings can also be used, as can different versions of the mouldings presented here. It should be noted that even the most complicated mouldings can, of course, be used.

The main requirement is that e.g. a moulding in accordance with FIG. 8 is included as a part of them.

Figure 9:
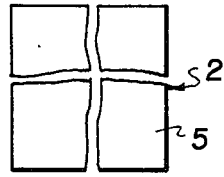
FIGS. 9 and 10 shows a model of the angle jointing unit according to the invention in two different projections.
Figure 10:
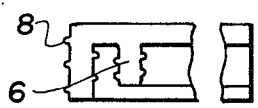

FIGS. 9 and 10 show an enlarged illustration of angle unit 2 in the application according to FIG. 1. As can be seen from FIG. 10, the tongues 6 have been provided with tooth-like projections 8 which considerably increase the static friction when the tongues are inserted in their grooves. Other means of increasing the friction of the tongues can, of course, also be used. A surface similar to that on a grater is, for example, suitable in an angle jointing unit of metal.

The invention can easily be applied on mouldings of both metal and plastic. Wood mouldings are also suitable for this purpose. The actual angle jointing unit can generally be most profitably manufactured of plastic or metal by means of casting in one piece.

When a particularly strong angle joint is required, the teeth 8 according to FIG. 10 can be increased in size and the groove walls in moulding 1 can be provided with recesses for the teeth 8. In this case, the angle unit 2 must be manufactured of, for example, plastic which is, to a certain extent, elastic.

A picture in accordance with the invention is framed so that the mouldings are laid out in a rectangular shape on, for example, a table whereupon the picture 10 which is to be framed together with its protective glass, and backing, if any, is placed on the edge flanges of the mouldings 7. The angle jointing units are then pressed home, whereupon part of stiffening plate 5 simultaneously presses the picture into position.

While specific embodiments of the invention have been shown and described in detail to illustrate the application of the principles of the invention, it will be understood that the invention may be embodied otherwise without departing from such principles.

I claim:

1. A frame joint construction comprising, at least one pair of moldings, each having at least one longitudinally extending groove and longitudinally extending tongue and each including a 45 degree mitre at the ends thereof which are abutting against each other, an angle unit having a stiffening plate lying in a plane generally parallel to the top rim of said moldings with at least one tongue engaged into said at least one longitudinally extending groove of said pair of moldings respectively fastening said pair of moldings together, each of said grooves and tongues extending perpendicularly to said plane of said moldings, said stiffening plate comprising two separate plates each having said at least one tongue engaged into said at least one longitudinally extending groove of said pair of moldings, respectively, said separate plates connected to each other by a cross member and having a shape of letter A with its upper tip missing so that said separate plates are spaced from said 45° mitres.

2. A frame joint construction according to claim 1, wherein each of said moldings includes a flange portion extending inwardly of the frame in the plane of said moldings, said stiffening plate including at least one portion over said flange whereby a structure to be framed is supported between said flange and said stiffening plate portion.

3. A frame joint construction according to claim 1, wherein each of said pairs of moldings includes at least one longitudinally extending tongue disposed inwardly of each of said separate plates with respect to the frame, each of said inwardly disposed tongues having a recess therein through which said cross member passes.

4. A frame joint construction according to claim 1, wherein each of said moldings have at least two longitudinally extending grooves, each separate plate having at least two tongues engaged into each of said longitudinally extending grooves.

5. A frame joint construction according to claim 1, which each tongue of said two separate plates includes at least one longitudinally extending projection for increasing frictional contact between each tongue of said two separate plates and each longitudinally extending groove of said pair of moldings respectively.

6. A frame joint construction according to claim 1, wherein said stiffening plate includes an undersurface with a top surface of each of said longitudinally extending tongues of said moldings abutting said undersurface, said cross member having an opening therein.

* * * * *